(12) United States Patent
Huang

(10) Patent No.: US 6,258,144 B1
(45) Date of Patent: Jul. 10, 2001

(54) AIR FILTERING DEVICE FOR A VEHICLE ENGINE INCLUDING INTERENGAGED FILTER MEMBERS AND A FLOW REGULATION MEMBER

(76) Inventor: Jui-Fa Huang, No. 467, Sec. 7, Chung-Lu Rd., Fuhsin Hsiang, Chang Hwa Hsien (TW)

( * ) Notice: Subject to any disclaimer, the term of this patent is extended or adjusted under 35 U.S.C. 154(b) by 0 days.

(21) Appl. No.: 09/428,206

(22) Filed: Oct. 27, 1999

(51) Int. Cl.[7] .............................. B01D 29/58; F02M 29/04
(52) U.S. Cl. ............................ 55/385.3; 55/414; 55/482; 55/510; 55/521; 123/593
(58) Field of Search .................................. 55/385.3, 413, 55/414, 482, 510, 521; 123/593

(56) References Cited

U.S. PATENT DOCUMENTS

| | | | |
|---|---|---|---|
| 5,113,838 | * 5/1992 | Kim | 123/593 |
| 5,549,724 | * 8/1996 | Mochida | 55/521 |
| 5,685,887 | * 11/1997 | Mochida | 55/521 |
| 6,158,412 | * 12/2000 | Kim | 123/306 |

* cited by examiner

Primary Examiner—David A. Simmons
Assistant Examiner—Robert A. Hopkins
(74) Attorney, Agent, or Firm—Ostrolenk, Faber, Gerb & Soffen, LLP

(57) ABSTRACT

An air filtering device for an engine includes two cone-shaped filtering members which are co-axially mounted with other and two collars are respectively engaged with two ends of the assembly of the two filtering members. Each filtering member has a spirally-shaped corrugated periphery. A manifold is connected between the filtering device and an engine, a tube connected to manifold and communicating with an interior of the manifold. A regulation member is received in the manifold and includes a ring with a plurality of blades engaged in the ring. Each blade is located inclinedly relative to the ring. Air flows in the filtering device from two ends and the periphery of the device and the filtered air flow becomes spiral flow entering the engine.

5 Claims, 10 Drawing Sheets

AIR FILTERING DEVICE FOR A VEHICLE ENGINE INCLUDING INTERENGAGED FILTER MEMBERS AND A FLOW REGULATION MEMBER

FIELD OF THE INVENTION

The present invention relates to an air filtering device, and more particularly, to an air filtering device for a vehicle engine wherein the air filter includes two cone-shaped filtering members co-axially mounted with each other and the two ends of the filter device are opened to allow air flowing therethrough so as to obtain more fresh air having certain speed.

BACKGROUND OF THE INVENTION

A conventional air filtering device for a vehicle engine is illustrated in FIG. 1 and generally includes a collar 100 with a tubular neck 101 extending from a top thereof and the tubular neck 101 has a threaded inside so as to engaged with a cap 200 which seals the neck 101. A filtering member 300 is a cone-shaped member and made of a metal netted layer and a non-woven layer. The filtering member 300 is made to have corrugated periphery in order to obtain a larger filtering area when air flowing through the periphery of the filtering member 300. The first end of the filtering member 300 is engaged with the collar 100 and the second end of the filtering member 300 is engaged with a groove 401 of a base member 400. Therefore, air can only flow through the corrugated periphery of the filtering member 300 and the speed of the air flow will be reduced because the direction of the air flow is changed perpendicularly to enter into the manifold which is connected between the engine and the filtering device. The slow flowing speed of the filtered air reduces the efficiency of the operation of the engine especially when the engine runs at a higher revolutions.

Furthermore, the installation of the manifold is always incurred by the deficiency of space. That is to say, the shape and the length of the manifold is designed and installed when all the parts around the engine are positioned so that the conventional manifold generally has a complicated shape including many curve portions. The manifold having the complicated shape further limits the speed of the filtered air flowing into the combustion chamber in the engine.

The present invention is to provide a filtering device which provides more volume of fresh air into the engine and the speed of the fresh air will not be reduced so as to increase the efficiency of the combustion in the engine.

SUMMARY OF THE INVENTION

In accordance with one aspect of the present invention, there is provided an air filtering device for an engine, comprising a first filtering member and a second filtering member both of which are cone-shaped netted members and have two open ends. A first ring-shaped collar has a first groove for engaging a large open end of the first filtering member and a second ring-shaped collar has a second groove which receives a small open end of the first filtering member so that the second filtering member is co-axially received in the first filtering member. A manifold has one end thereof connected to the first ring-shaped collar and the other end of the manifold is connected to the engine. A regulation member is received in the manifold and includes a ring with a plurality of blades engaged with the ring. Each blade is positioned inclined to a plane where the ring is located.

The object of the present invention intends to provide an air filtering device which has two cone-shaped filtering members co-axially mounted with each other and the two ends of the filtering device are opened so as to allow more air to be filtered via the filtering members.

Another object of the present invention is to provide an air filtering device wherein the manifold has a regulation member received therein so as to produce spiral air flow at a certain speed when the filtered air passing through the regulation member.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Referring to FIGS. 2, 3A, 3B and 7, the air filtering device in accordance with the present invention comprises a first filtering member 11 and a second filtering member 12 which is co-axially received in the first filtering member 11. The first filtering member 11 is a cone-shaped netted member and the first filtering member 11 has a first large open end and a first small open end. The second filtering member 12 is a cone-shaped netted member and the second filtering member 12 has a second large open end and a second small open end. Both of the first filtering member 11 and the second filtering member 12 have a spirally-shaped corrugated periphery which is composed of a layer of netted metal, a layer of non-woven fabric and active carbon is received between the netted metal and the non-woven fabric.

Figure 1:
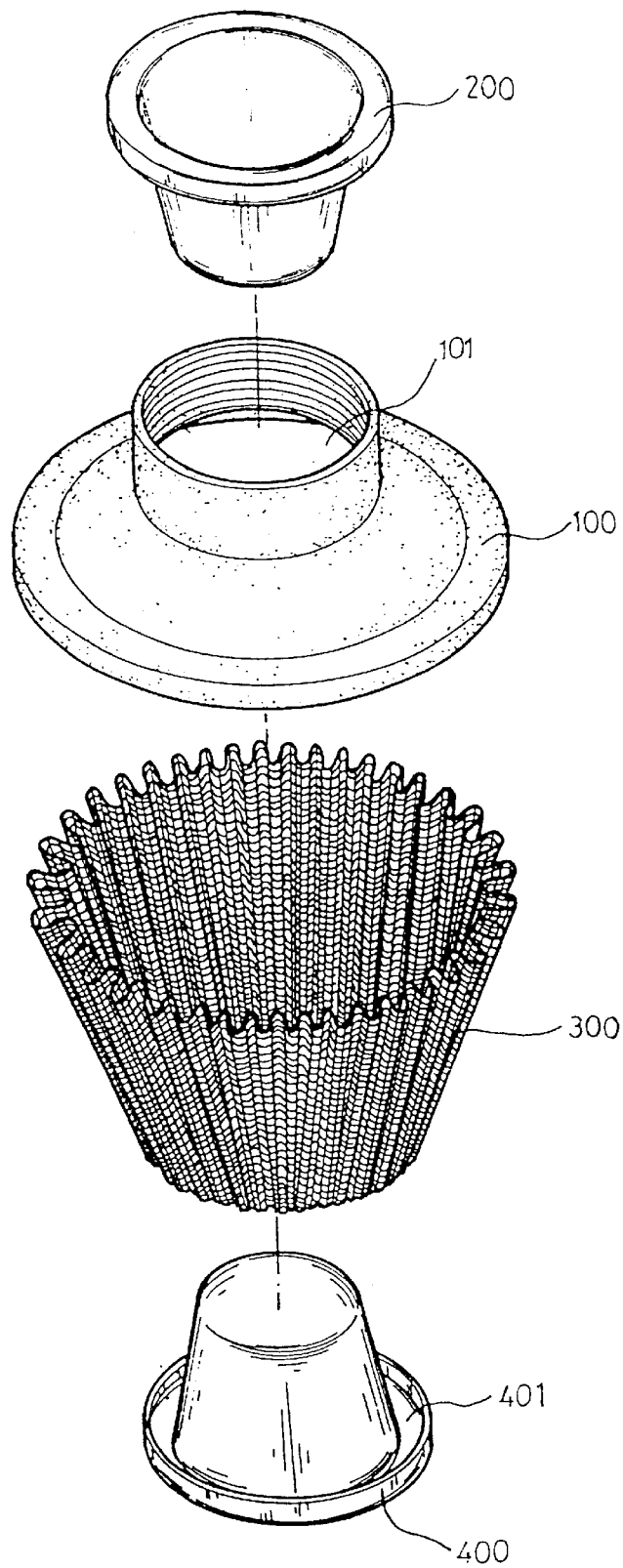
FIG. 1 is an exploded view to show a conventional air filtering device.
Figure 2:
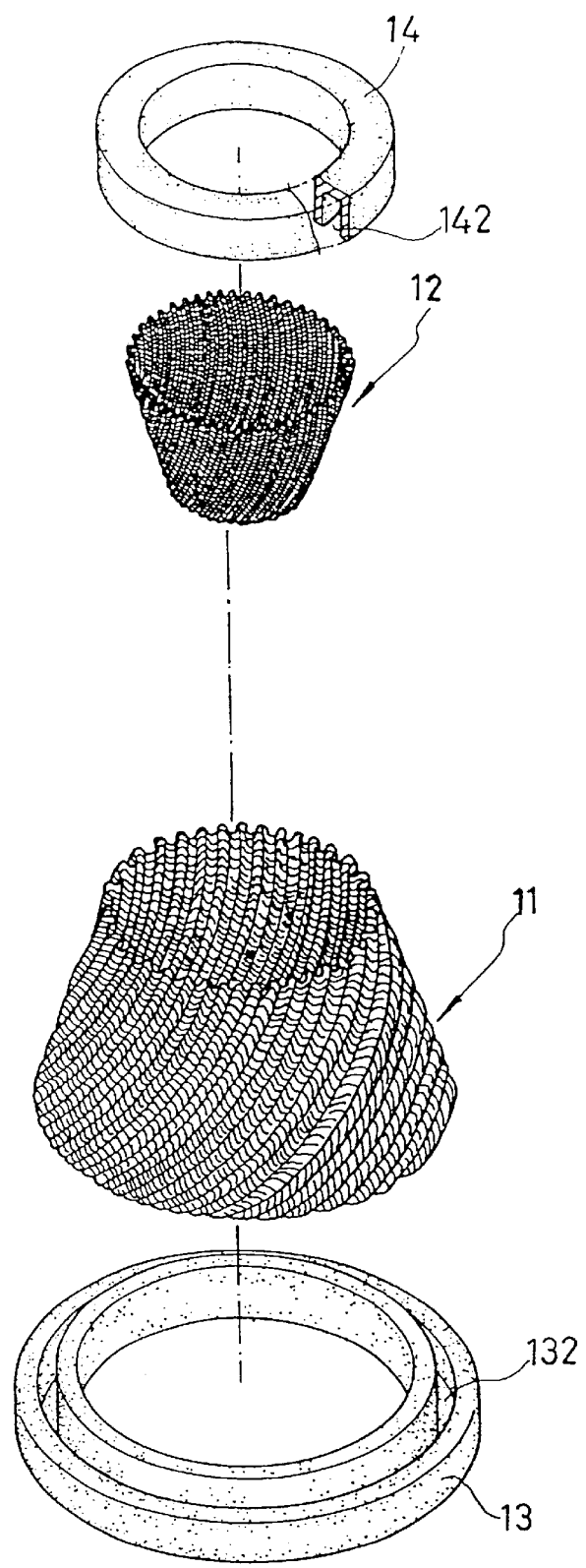
FIG. 2 is an exploded view to show the two filtering members in the an air filtering device in accordance with the present invention.
Figure 3A:
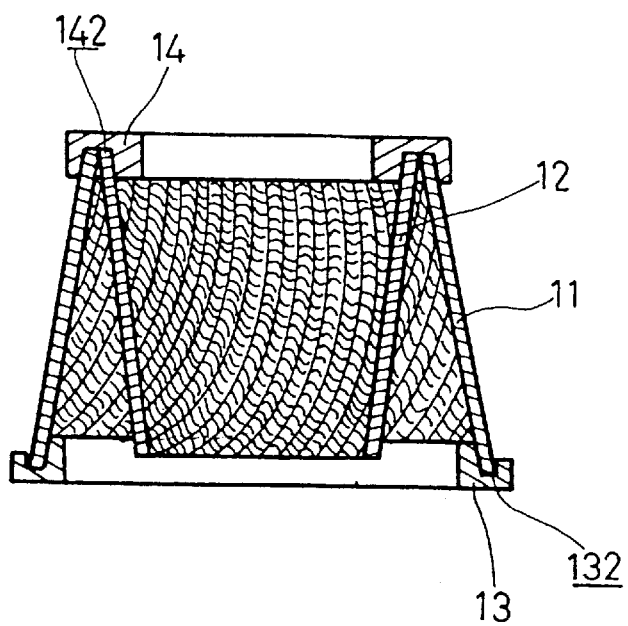
FIG. 3A is a cross-sectional view to show the combination of the two air filtering members and two collars of the present invention.
Figure 3B:
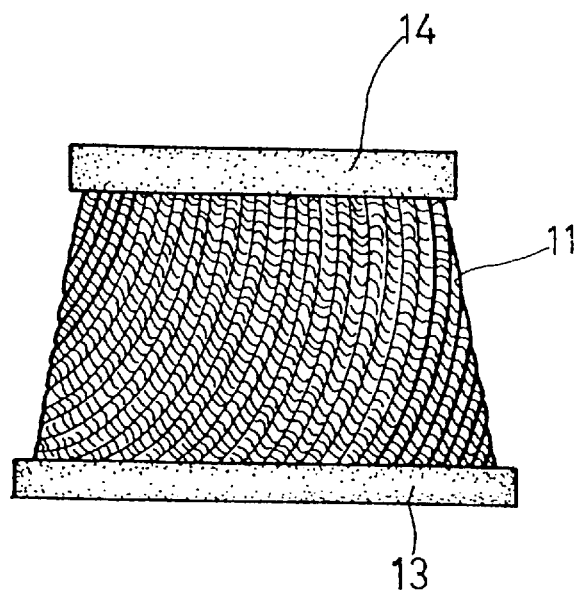
FIG. 3B is an illustrative view to show the combination of the two air filtering members and two collars of the present invention.

A first ring-shaped collar has a first groove 132 defined therein and the first large open end of the first filtering member 11 is engaged with the first groove 132 of the first ring-shaped collar 13. A second ring-shaped collar 14 has a second groove 142 defined therein, the first small open end of the first filtering member 11 and the second large open end of the second filtering member 12 are respectively received in the second groove 142. Therefore, the second filtering member 12 is co-axially received in the first filtering member 11 and the second small open end of the second filtering member 12 is received in the first filtering member 11. Air may flows into the combination of the first filtering member 11 and the second filtering member 12 via the two open ends and the periphery of the two filtering members 11, 12 so that the volume of the air to be filtered is much more than that in the conventional air filtering device as shown in FIG. 1.

Figure 7:
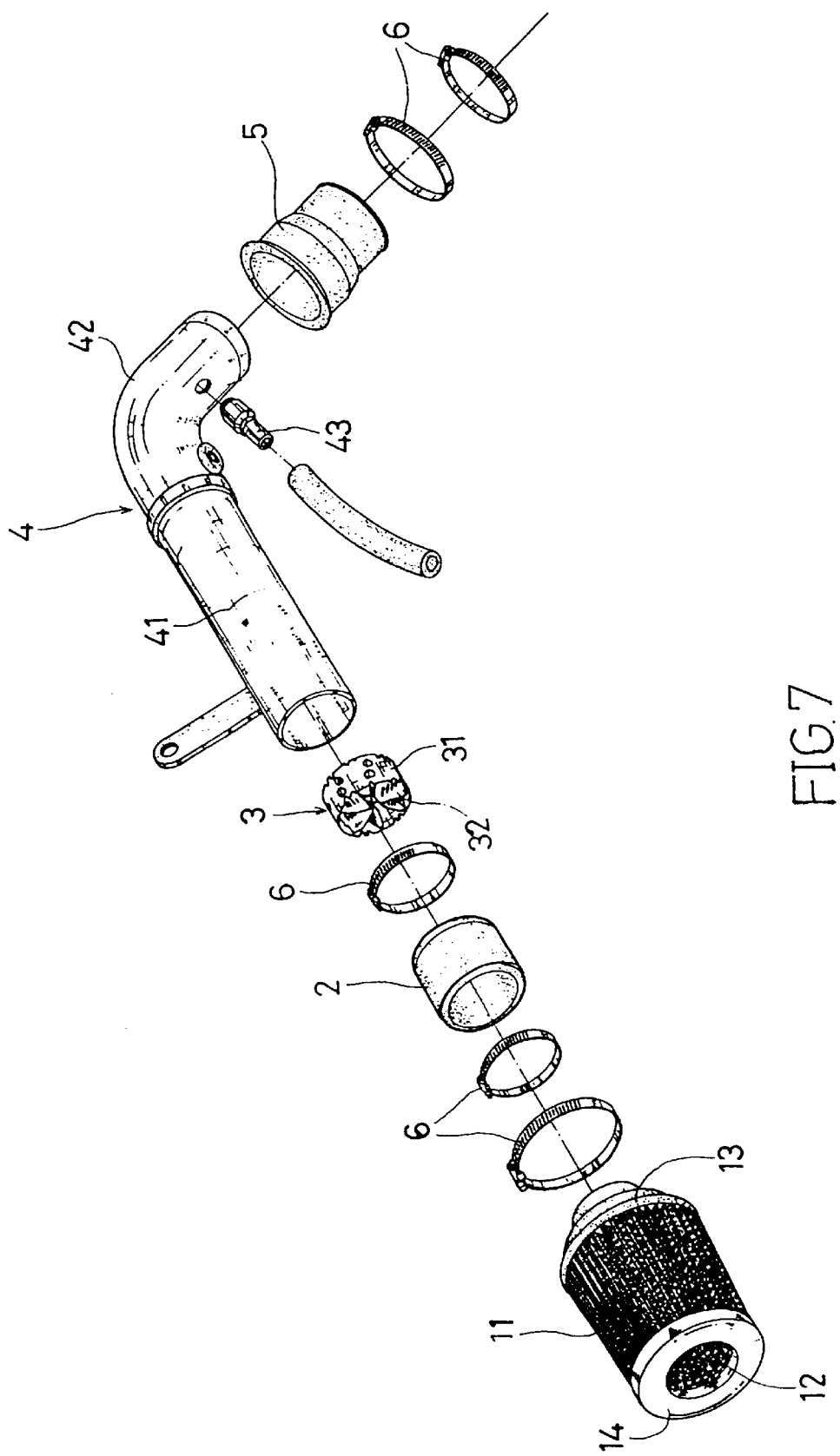
FIG. 7 is an exploded view to show the air filtering device including the manifold, the elbow connector.
Figure 8:
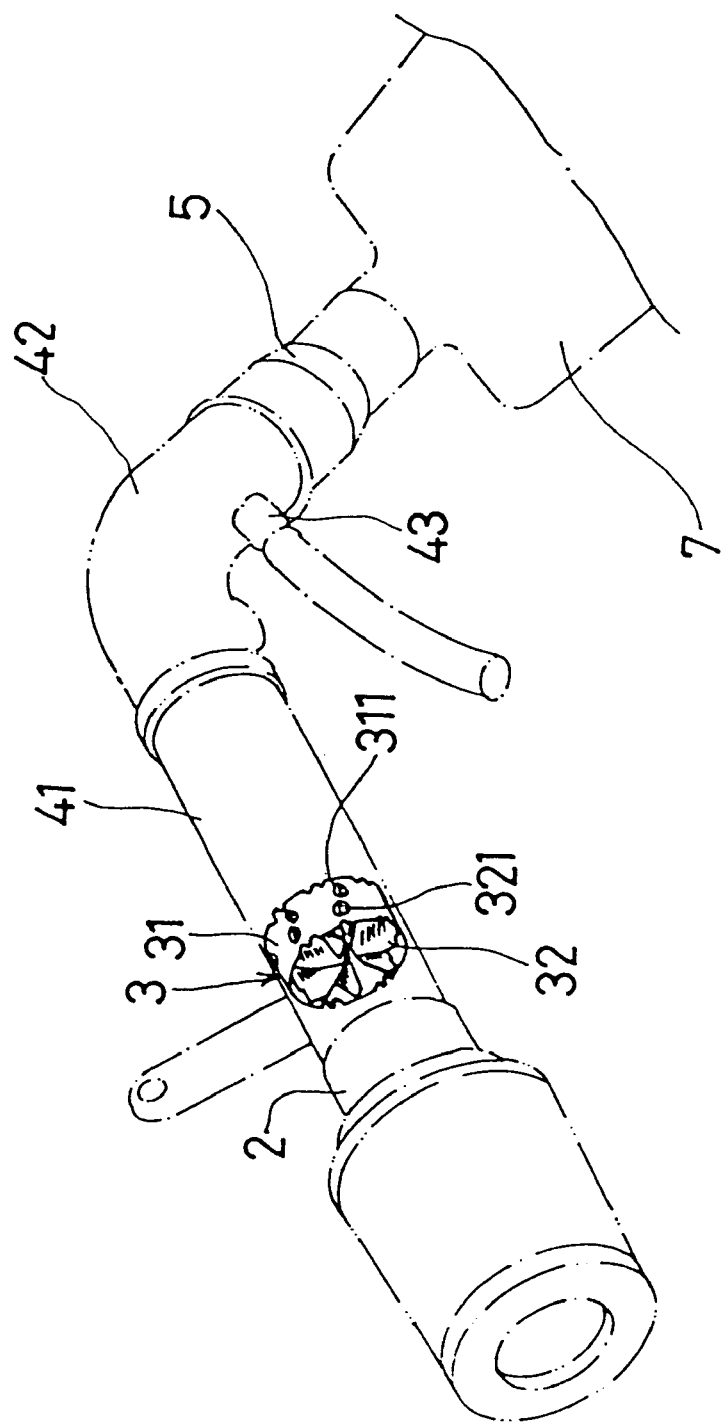
FIG. 8 is an illustrative view to show the combination of the air filtering device wherein the regulation member is received in the manifold.

A manifold 41 has one end thereof connected to the first ring-shaped collar 13 by a connecting tube 2 and three clamping rings 6, and the other end of the manifold 41 is connected to an elbow connector 42 which is connected to the engine 7 by a connecting tube 5 and clamping rings 6 as shown in FIG. 7.

Figure 4A:
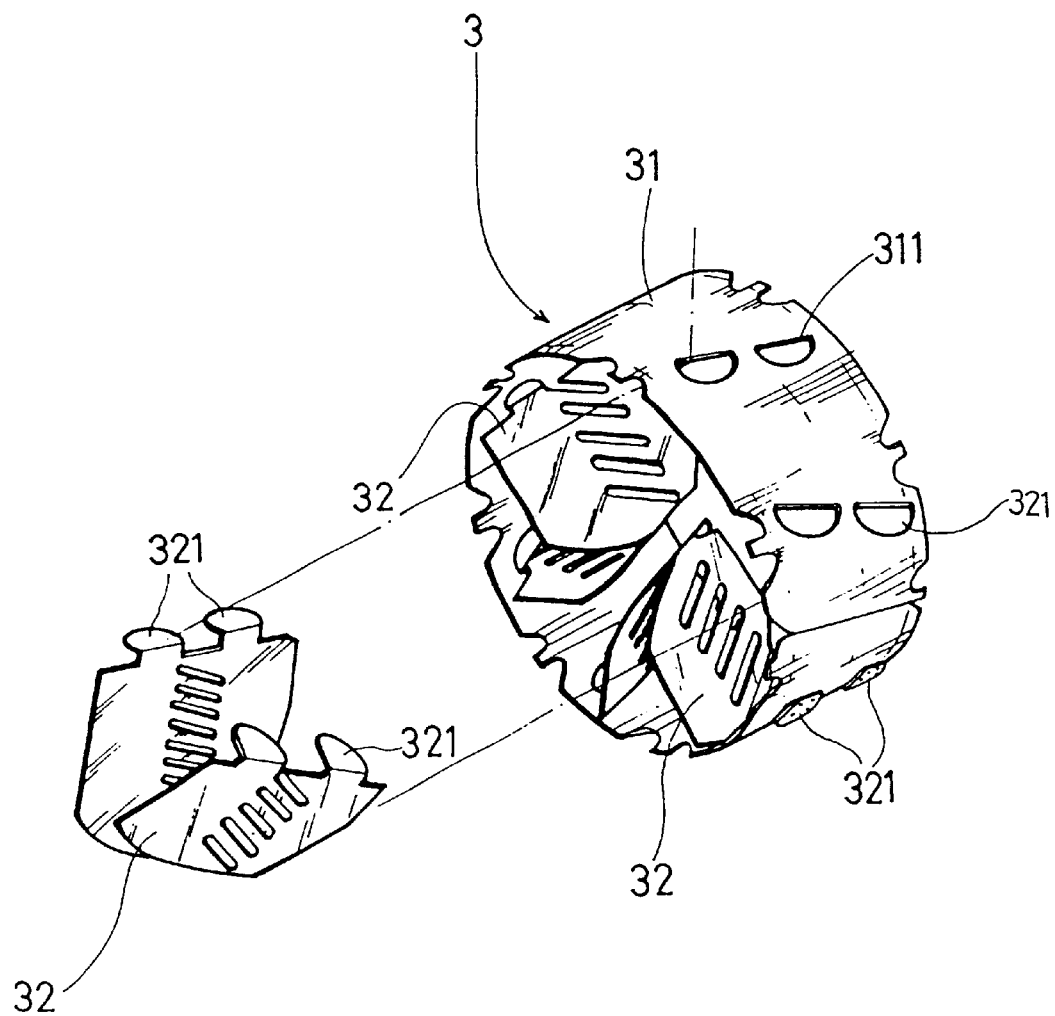
FIG. 4A is an exploded view to show the blades and the ring of the regulation member of the present invention.
Figure 4B:
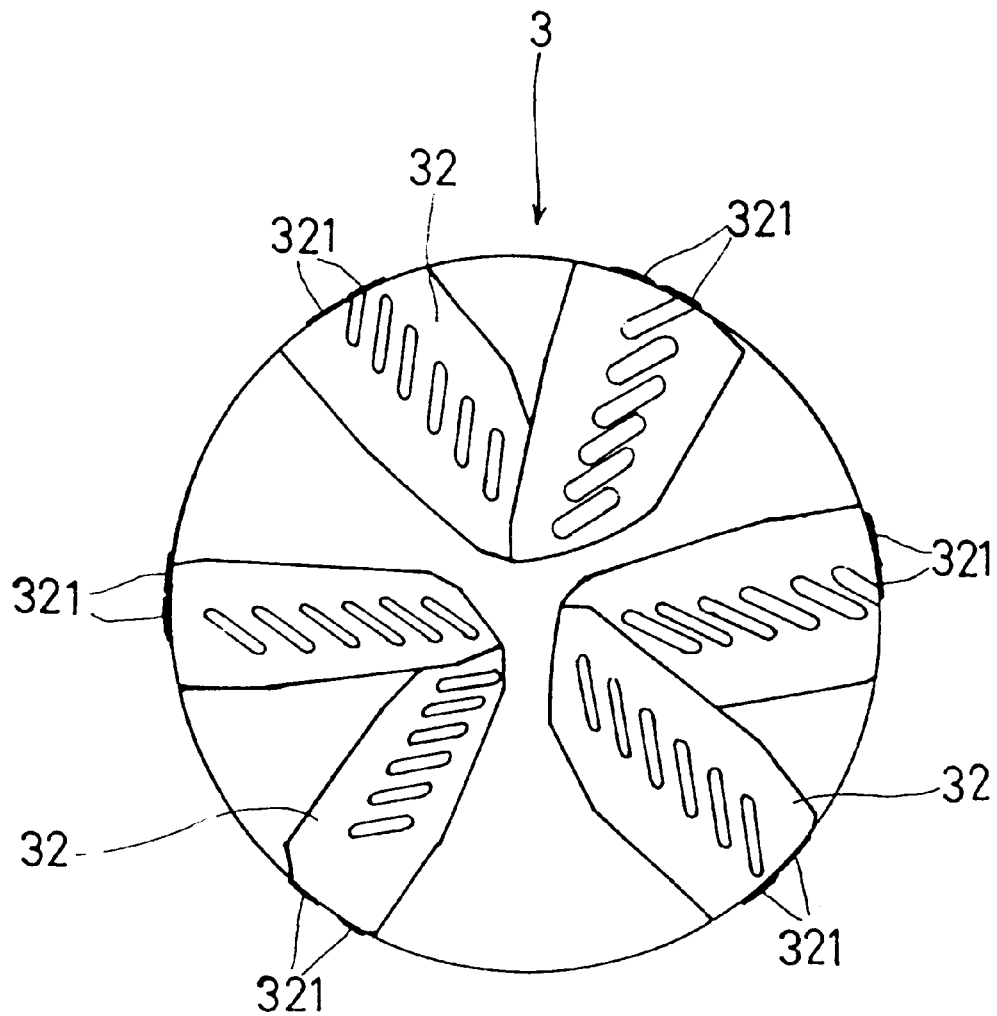
FIG. 4B is a plan view to show the arrangement of the blades in the ring of the regulation member of the present invention.
Figure 5:
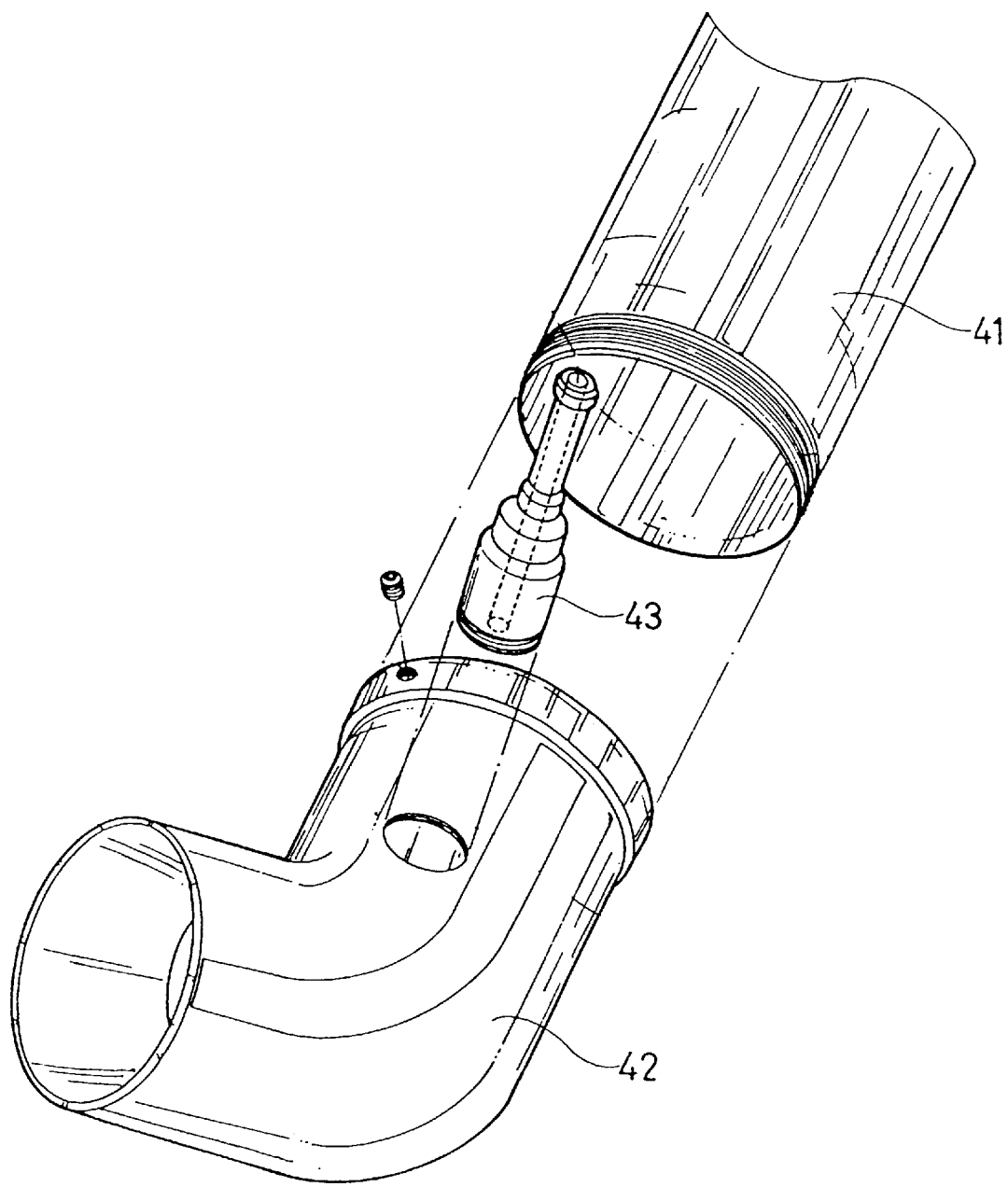
FIG. 5 is an exploded view to show the manifold and an elbow connector to be connected to the engine of the air filtering device of the present invention.
Figure 6:
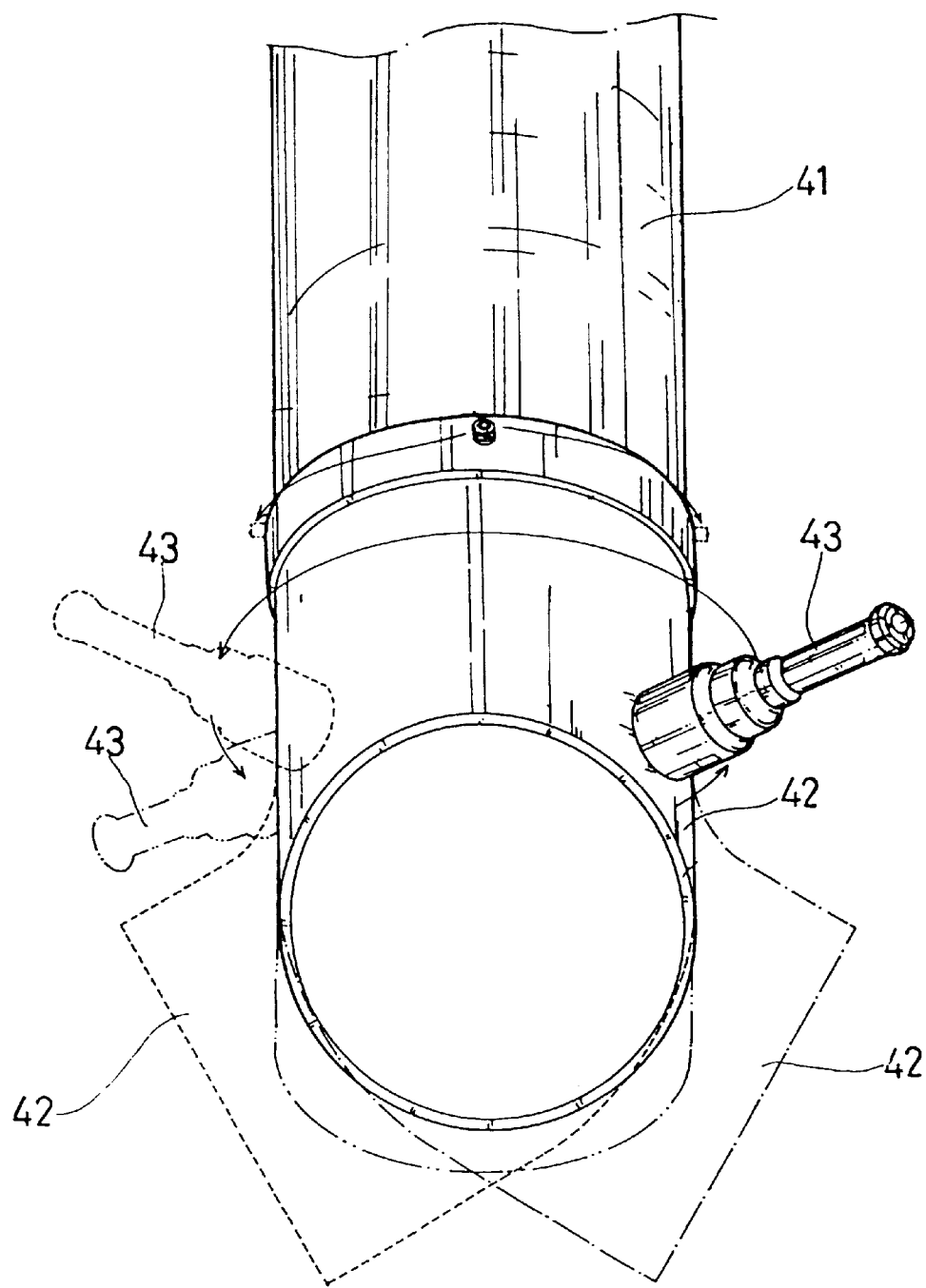
FIG. 6 shows a combination of the manifold and the elbow connector which is rotatable relative to the manifold.

Further referring FIGS. 3, 4A and 4B, a regulation member 3 is received in the manifold 41 and includes a ring 31 and a plurality of blades 32 engaged with the ring 31. The ring 31 of the regulation member 3 has a plurality of slits 311 defined radially therethrough and each blade 32 has protrusions 321 extending from two ends thereof so that the protrusions 321 are inserted into the slits 311 in the ring 31. Each blade 32 of the regulation member 3 has a plurality slots defined therethrough. Each blade 32 is folded at the mediated portion so that each blade 32 is positioned inclined to a plane where the ring 31 is located. In other words, each blade 32 is inclined relative to the direction that the filtered air flows.

Figure 9:
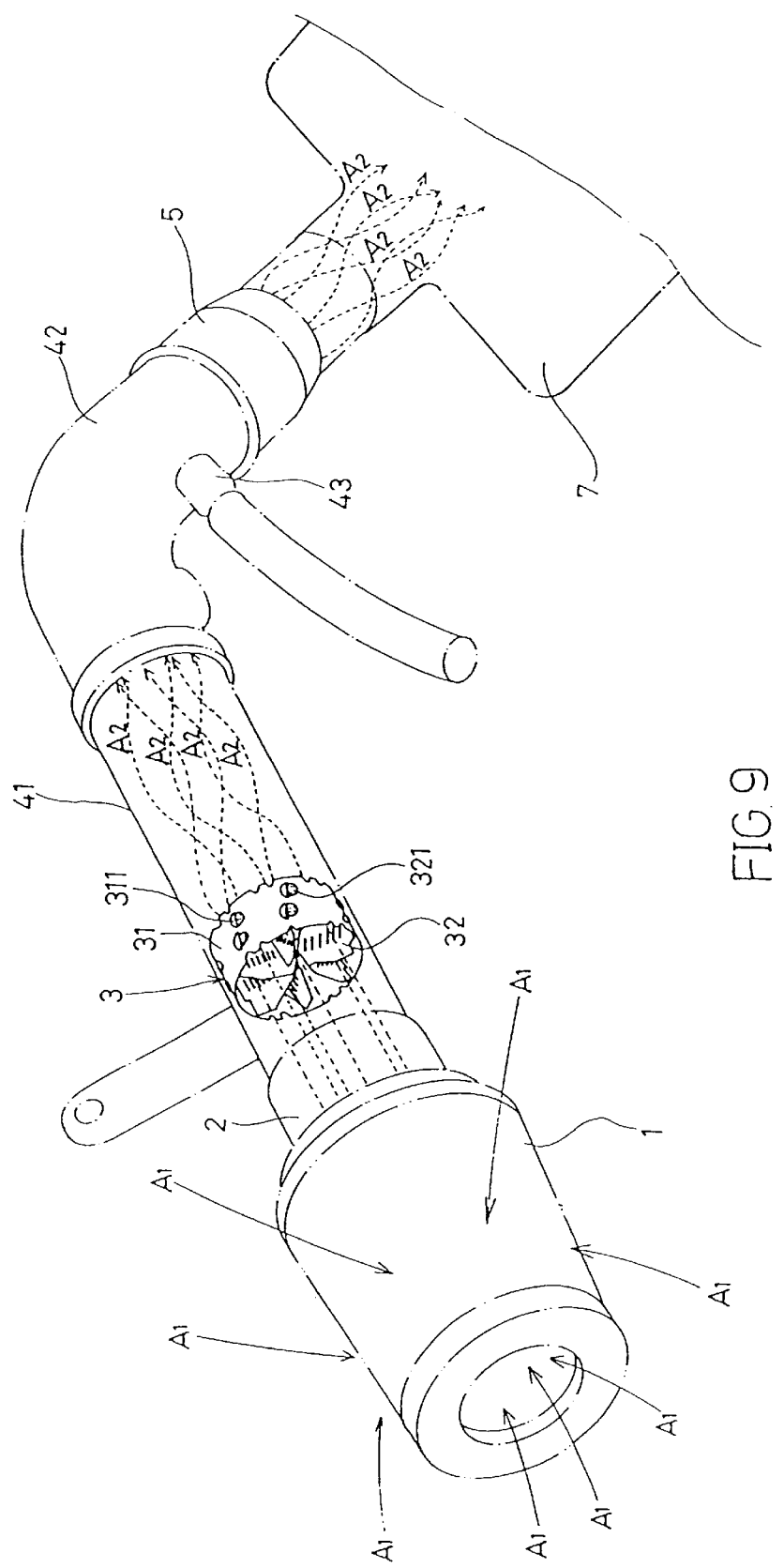
FIG. 9 is an illustrative view to show spiral air flow is generated when the filtered air passes through the regulation member in the manifold.

Further referring to FIGS. 5, 6, 8 and 9, a connecting tube 43 is connected to the elbow connector 42 of the manifold 41 and communicates with an interior of the manifold 41 so as to provide fresh air into the manifold 41 if needed. The elbow connector 42 is rotatable relative to the manifold 41 so as to be easily connected to the engine 7. Therefore, it is convenient for the assembler to arrange the position of the manifold 41 in the space below the hood of a car. The air flow A1 as shown in FIG. 9 flows through the first filtering member 11 and the second filtering member 12 via two open ends and the periphery of the combination of the two filtering members 11, 12, the filtered air will become spiral air flow A2 because the blades 32 and the spiral air flow maintains a certain speed and enters into the engine 7.

Accordingly, the air to be filtered may enter in the filtering members 11, 12 from longitudinal direction and radial direction so that the speed will be loosened too much. The spiral air flow increases the mixture feature with the moistures of the gas ejected into the engine so that the efficiency of the engine is increased.

While we have shown and described various embodiments in accordance with the present invention, it should be clear to those skilled in the art that further embodiments may be made without departing from the scope and spirit of the present invention.

What is claimed is:

1. An air filtering device for an engine, comprising:

a first filtering member which is a cone-shaped netted member, said first filtering member having a first large open end and a first small open end, a second filtering member which is a cone-shaped netted member, said second filtering member having a second large open end and second small open end;

a first ring-shaped collar having a first groove defined therein and said first large open end of said first filtering member engaged with said first groove of said first ring-shaped collar;

a second ring-shaped collar having a second groove defined therein, said first small open end of said first filtering member and said second large open end of said second filtering member respectively received in said second groove, said second filtering member co-axially received in said first filtering member and said second small open end of said second filtering member received in said first filtering member;

a manifold having one end thereof connected to said first ring-shaped collar and the other end of said manifold adapted to be connected to the engine, and a regulation member received in said manifold and having a ring and a plurality of blades engaged with said ring, each blade positioned inclined to a plane where said ring is located;

said ring of said regulation member has a plurality of slits defined radially therethrough and each blade having two opposite ends and having protrusions extending from said two ends thereof so that said protrusions are inserted into said slits in said ring.

2. The device as claimed in claim 1, wherein said first filtering member has a spirally-shaped corrugated periphery.

3. The device as claimed in claim 1, wherein said second filtering member has a spirally-shaped corrugated periphery.

4. The device as claimed in claim 1, wherein each blade of said regulation member has a plurality of slots defined therethrough.

5. The device as claimed in claim 1 further comprising a tube connected to said manifold and communicating with an interior of said manifold.

* * * * *